(12) United States Patent
Ahn et al.

(10) Patent No.: US 8,861,529 B2
(45) Date of Patent: Oct. 14, 2014

(54) ETHERNET APPARATUS AND METHOD OF ADJUSTING TRANSMISSION RATE THEREOF

(75) Inventors: Kye-Hyun Ahn, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 391 days.

(21) Appl. No.: 12/940,978

(22) Filed: Nov. 5, 2010

(65) Prior Publication Data

US 2011/0110253 A1 May 12, 2011

(30) Foreign Application Priority Data

Nov. 12, 2009 (KR) ................. 10-2009-0109309

(51) Int. Cl.
 *H04L 12/56* (2006.01)
 *H04L 12/709* (2013.01)
 *H04L 12/803* (2013.01)
 *H04L 12/801* (2013.01)

(52) U.S. Cl.
 CPC .............. *H04L 47/10* (2013.01); *H04L 45/245* (2013.01); *H04L 47/125* (2013.01); *Y02B 60/33* (2013.01)
 USPC ........................................................ 370/394

(58) Field of Classification Search
 None
 See application file for complete search history.

(56) References Cited

U.S. PATENT DOCUMENTS

| | | | | |
|---|---|---|---|---|
| 6,081,720 A * | 6/2000 | Sampson | ...................... | 455/450 |
| 6,434,145 B1 * | 8/2002 | Opsasnick et al. | ............. | 370/394 |
| 7,346,127 B2 * | 3/2008 | Farineau et al. | .............. | 375/316 |
| 7,373,084 B2 * | 5/2008 | Yun et al. | .......................... | 398/72 |
| 7,406,042 B1 * | 7/2008 | Shridhar et al. | .............. | 370/230 |
| 7,680,478 B2 * | 3/2010 | Willars et al. | .............. | 455/343.2 |
| 7,839,839 B2 * | 11/2010 | Brown et al. | ................. | 370/350 |
| 7,869,468 B1 * | 1/2011 | Giannakopoulos et al. | .. | 370/535 |
| 8,230,240 B2 * | 7/2012 | Diab et al. | .................... | 713/300 |
| 8,249,080 B1 * | 8/2012 | Giannakopoulos et al. | ........................ | 370/395.64 |
| 8,483,246 B2 * | 7/2013 | Wojtowicz | .................... | 370/535 |
| 2009/0097442 A1 * | 4/2009 | Diab et al. | .................... | 370/329 |
| 2009/0103563 A1 | 4/2009 | Jung et al. | | |
| 2009/0154455 A1 * | 6/2009 | Diab | .............................. | 370/389 |
| 2009/0154473 A1 * | 6/2009 | Diab et al. | .................... | 370/400 |
| 2009/0154492 A1 | 6/2009 | Diab et al. | | |
| 2009/0185565 A1 * | 7/2009 | Diab et al. | .................... | 370/394 |
| 2009/0274068 A1 * | 11/2009 | Kostner et al. | ................ | 370/255 |
| 2011/0173352 A1 * | 7/2011 | Sela et al. | ....................... | 710/16 |
| 2012/0155486 A1 * | 6/2012 | Ahn et al. | ..................... | 370/433 |

FOREIGN PATENT DOCUMENTS

| | | |
|---|---|---|
| KR | 10-2004-0014406 A | 2/2004 |
| KR | 10-2009-0039071 A | 4/2009 |
| KR | 10-2009-0065465 A | 6/2009 |
| WO | WO 02/33853 A1 | 4/2002 |

* cited by examiner

*Primary Examiner* — Gregory Sefcheck

(57) ABSTRACT

A plurality of lanes are formed between an Ethernet apparatus and a remote Ethernet apparatus. The Ethernet apparatus determines a transmission rate for transmitting a packet and determines the number of lanes to transmit a packet among a plurality of lanes according to the determined transmission rate. The Ethernet apparatus activates the determined number of lanes of a plurality of lanes and transmits the packet to the remote Ethernet apparatus through the activated lanes. Further, the Ethernet apparatus sets the number of lanes for receiving a packet according to a transmission rate, activates the set number of lanes of a plurality of lanes in a state that can receive the packet according to the set number of lanes, and receives packets that are transmitted from the remote Ethernet apparatus through the activated lanes.

19 Claims, 5 Drawing Sheets

ETHERNET APPARATUS AND METHOD OF ADJUSTING TRANSMISSION RATE THEREOF

CROSS-REFERENCE TO RELATED APPLICATION

This application claims priority to and the benefit of Korean Patent Application No. 10-2009-0109309 filed in the Korean Intellectual Property Office on Nov. 12, 2009, the entire contents of which are incorporated herein by reference.

BACKGROUND OF THE INVENTION (a) Field of the Invention

The present invention relates to an Ethernet apparatus and a method of adjusting a transmission rate thereof. Particularly, the present invention relates to an Ethernet apparatus having a multiple lane structure and a method of adjusting a transmission rate of the Ethernet apparatus.

(b) Description of the Related Art

As the number of apparatuses that are connected to a data network increases and a high data transmission ratio is required, new transmission techniques that can transmit data at a high speed are necessary.

As a data transmission speed increases, power consumption of a communication apparatus greatly increases. Accordingly, when communicating data in an Ethernet interface of a high speed, a method of reducing power consumption includes a rapid PHY selection (RPS) method and a low power idle (LPI) method.

The RPS method is embodied using a physical layer (PHY) module having a transmission rate of a high speed and a PHY module having a transmission rate of a low speed. The RPS method operates by selecting a PHY module that supports a transmission rate of a high speed when the amount of data to transmit is large, and operates by selecting a PHY module of a low speed using low power when the amount of data to transmit is less.

That is, in the RPS method, a PHY module that can be independently operated according to a supporting transmission rate should be embodied, and in order to perform transmission rate conversion between different PHY modules, a protocol for an agreement between two apparatuses that are positioned at both ends of a link should be performed. However, in the RPS method, in a transition process between different PHY modules, there is a problem that a time period in which data cannot be transmitted using a link exists.

The LPI method transmits with a maximum transmission rate in which a link supports transmission when data to transmit exists, and operates a link in an idle state when data to transmit does not exist.

The LPI method can reduce power consumption by sustaining some of circuits requiring for transmitting/receiving data in an inactive state when data to transmit does not exist. Further, the LPI method sustains state information for allowing a link to operate again in a transmission active state by periodically transmitting a control signal in a period of sustaining a link in an idle state.

However, the LPI method can effectively reduce energy when transmitting traffic having strong burst characteristics, but has a problem that it cannot reduce energy when transmitting traffic of a streaming form requiring a continuous transmission service with a low data rate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an Ethernet apparatus and a method of adjusting a transmission rate thereof having advantages of adjusting a transmission rate when aligning a transmission channel or lanes in order to transmit a packet through the channel or the lanes in a transmission activation state in the Ethernet apparatus.

An exemplary embodiment of the present invention provides a method of adjusting a transmission rate when transmitting a packet stream from an Ethernet apparatus to a remote Ethernet apparatus, the method including: determining, by the Ethernet apparatus, a transmission rate of the packet stream; setting, by the Ethernet apparatus, the number of lanes to transmit the packet stream according to the determined transmission rate; converting, by the Ethernet apparatus, a state of at least one lane to an activation state in which a packet can be transmitted according to the set number; and transmitting, by the Ethernet apparatus, the packet stream to the remote Ethernet apparatus with the determined transmission rate through the activated lane.

Another embodiment of the present invention provides a method of adjusting a transmission rate when an Ethernet apparatus receives packets from a remote Ethernet apparatus, the method including: determining, by the Ethernet apparatus, the transmission rate; setting, by the Ethernet apparatus, the number of lanes to receive packets according to the determined transmission rate; converting, by the Ethernet apparatus, a state of at least one of lane to an activation state in which a packet can be received according to the set number; and receiving, by the Ethernet apparatus, the packets with the determined transmission rate from the remote Ethernet apparatus through the activated lane.

Yet another embodiment of the present invention provides an Ethernet apparatus including: a transmission rate controller that determines a transmission rate corresponding to packets to transmit and that determines the set number of lanes based on the determined transmission rate; a lane state controller that converts a state of a plurality of lanes to one of an activation state in which a packet can be transmitted and an inactivation state in which a packet cannot be transmitted using the set number of lanes; and a lane transmission processor that distributes the packets to lanes in an activation state and that transmits at least one packet to an external remote Ethernet apparatus through a corresponding lane.

Yet another embodiment of the present invention provides an Ethernet apparatus including: a lane state controller that sets the number of lines for receiving a packet according to a transmission rate for receiving the packet and that converts a state of a plurality of lanes to one of an activation state in which a packet can be received and an inactivation state in which a packet cannot be received based on the set number of lanes; and a lane reception processor that receives at least one packet that is transmitted from a remote Ethernet apparatus through each lane in an activation state and that combines the received packets into one packet stream.

Yet another embodiment of the present invention provides a method of adjusting a transmission rate of a packet between an Ethernet apparatus and a remote Ethernet apparatus, the method including: receiving, when transmitting a packet stream with a first transmission rate, by the Ethernet apparatus, a lane state message from the remote Ethernet apparatus, wherein the lane message comprises an identifier of at least one lane activated according to a second transmission rate that is determined by the remote Ethernet apparatus; determining, by the Ethernet apparatus, the transmission rate from the first transmission rate into the second transmission rate based on the lane state message; setting, by the Ethernet apparatus, the number of lanes to transmit the packet stream according to the second transmission rate; converting, by the Ethernet apparatus, a state of at least one lane to an activation state in which a packet can be transmitted according to the set number; transmitting, by the Ethernet apparatus, the packet stream to the remote Ethernet apparatus with the second transmission rate through the activated lane; and receiving, by the remote Ethernet apparatus, the packets with the second transmission rate from the Ethernet apparatus through at least one lane in activation state in which a packet can be received according to the set number based on the second transmission rate.

DETAILED DESCRIPTION OF THE EMBODIMENTS

Figure 1:
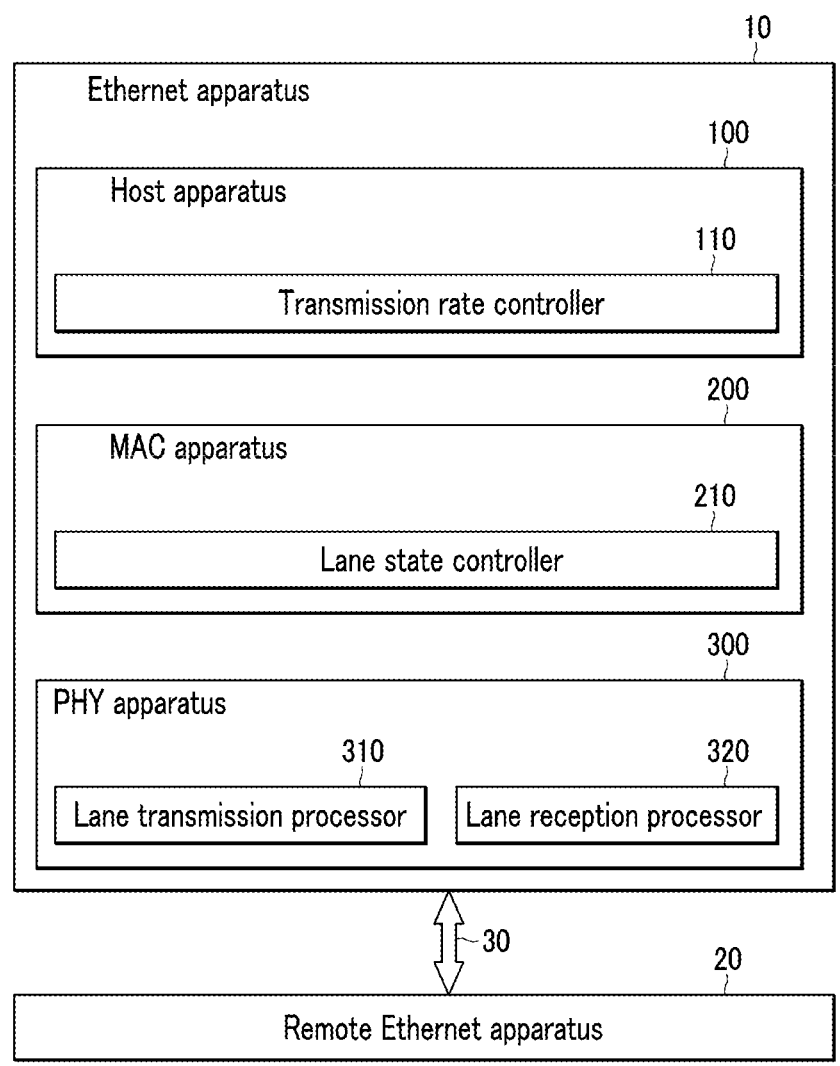
FIG. 1 is a block diagram illustrating an Ethernet apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, an Ethernet apparatus and a method of adjusting a transmission rate thereof according to an exemplary embodiment of the present invention will be described in detail with reference to the accompanying drawings.

First, an Ethernet interface of a high speed is formed with a plurality of physical channels of a low speed. Here, a physical channel of a low speed is an example of a lane. Further, the lane is an example of a logical channel in a module that performs electrical packet processing within a system as well as a physical channel that is divided by a physical signal.

That is, an Ethernet apparatus according to an exemplary embodiment of the present invention has a lane structure having different processing speeds and number according to position such as within a media access control (hereinafter referred to as an "MAC") apparatus, within a PHY apparatus, an interface between the MAC apparatus and the PHY apparatus, and an interface between the PHY apparatus and a transmission link.

FIG. 1 is a block diagram illustrating an Ethernet apparatus according to an exemplary embodiment of the present invention.

Referring to FIG. 1, an Ethernet apparatus 10 is connected to a remote Ethernet apparatus 20 using an Ethernet interface. Here, the Ethernet apparatus 10 and the remote Ethernet apparatus 20 perform communication through an Ethernet link 30.

The Ethernet apparatus 10 includes a host apparatus 100, an MAC apparatus 200, and a PHY apparatus 300.

The host apparatus 100 determines the number of lanes corresponding to data packets (hereinafter referred to as "packet") to transmit through the Ethernet link 30. For this reason, the host apparatus 100 includes a transmission rate controller 110.

The transmission rate controller 110 determines whether a present transmission rate is higher or lower than a required transmission rate in the Ethernet link 30 based on at least one of a use ratio of the Ethernet link 30, past or present traffic statistics, and available resources. Here, available resources include, for example, buffer space, an operator policy, and electric power. Further, the transmission rate controller 110 determines the number of lanes that decrease or increase a transmission rate based on the determined transmission rate, and transfers a transmission rate change request message to the MAC apparatus 200.

The MAC apparatus 200 includes a lane state controller 210.

The lane state controller 210 transfers a lane control message that controls a lane state to the PHY apparatus 300 in order to change a transmission rate to correspond to the received transmission rate change request message. Further, the lane state controller 210 transfers a lane state message to the remote Ethernet apparatus 20 to notify a state change of lanes. Here, the lane state message is a control message that the MAC apparatus 200 of the Ethernet apparatus 10 and the remote Ethernet apparatus 20 send and receive, and includes an identifier of the lane and a state of a corresponding lane.

When the lane state message is received from the remote Ethernet apparatus 20, the lane state controller 210 reads the lane state message and generates a control message that controls a reception state of the lane based on the read result. Next, the lane state controller 210 transfers a lane control message to the PHY apparatus 300.

The PHY apparatus 300 changes a state of a transmission terminal and/or a reception terminal of each lane to correspond to the received lane control message. In this case, the PHY apparatus 300 changes a state of a transmission terminal and/or a reception terminal from an activation state to an inactivation state or from an inactivation state to an activation state. For this reason, the PHY apparatus 300 includes a lane transmission processor 310 and a lane reception processor 320.

The lane transmission processor 310 includes a packet distributor that distributes a packet stream PS that is received from the MAC apparatus 200 to lanes in an activation state.

The lane reception processor 320 includes a packet combining device that combines packets that are received from a plurality of lanes into one packet stream.

A lane according to an exemplary embodiment of the present invention is a physically independent route and therefore represents different delay phenomena. Accordingly, an arriving order of packets that are received through each lane may not be identical to a transmission order from a transmission terminal.

Accordingly, in an exemplary embodiment of the present invention, in a process of transmitting and receiving a packet through lanes, a marking packet that supports order alignment between lanes is periodically inserted.

Next, the PHY apparatus 300 in a process of transmitting a packet according to an exemplary embodiment of the present invention will be described in detail with reference to FIG. 2.

Figure 2:
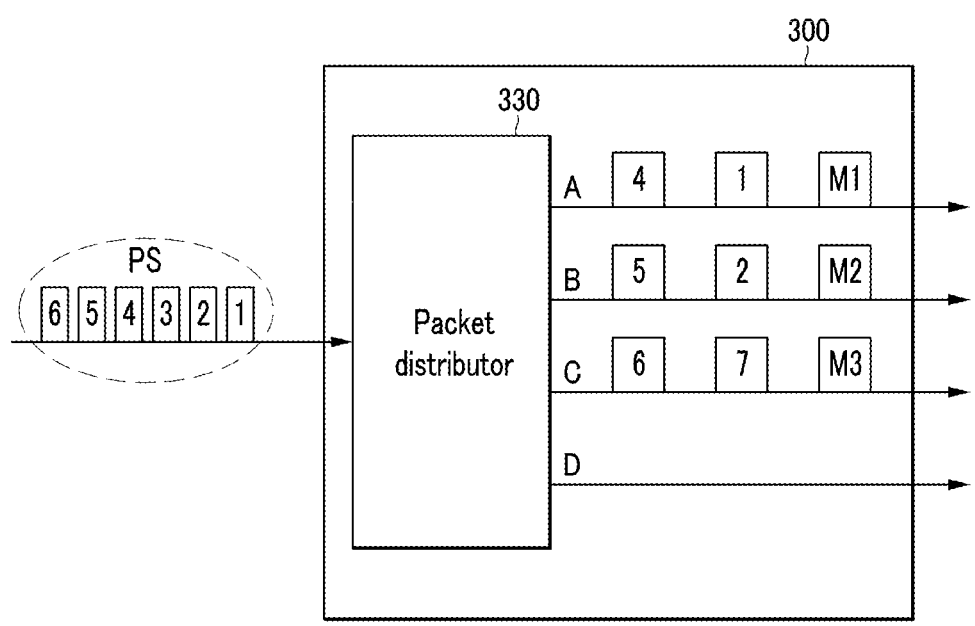
FIG. 2 is a block diagram illustrating a PHY apparatus in a process of transmitting a packet according to an exemplary embodiment of the present invention.

FIG. 2 is a block diagram illustrating a PHY apparatus in a process of transmitting a packet according to an exemplary embodiment of the present invention.

Referring to FIG. 2, the PHY apparatus 300 receives a packet stream PS from the MAC apparatus 200.

A packet distributor 330 that is included in the PHY apparatus 300 distributes a packet stream PS including, for example, a first packet 1 to a sixth packet 6, to lanes in which a transmission function is activated. Here, three lanes A, B, and C other than a fourth lane D of 4 lanes are lanes in a state where a transmission function is activated. For example, the packet distributor 330 distributes the first packet 1 and the fourth packet 4 to the first lane A, the second packet 2 and the fifth packet 5 to the second lane B, and the third packet 3 and the sixth packet 6 to the third lane C. However, a packet is not distributed to the fourth lane D in an inactivation state.

When a packet stream PS is distributed to the lanes, the PHY apparatus 300 inserts marking packets M1, M2, and M3 between packets in the respective lanes at the same time point. Here, a bit value of the marking packet is differently recorded at each lane and thus performs a function as an identifier that distinguishes an individual lane. That is, values of marking packets that are inserted into the second lane B and the third lane C may be different, and values of the marking packets are not limited thereto.

The marking packet according to an exemplary embodiment of the present invention is periodically inserted between packets. Further, in an exemplary embodiment of the present invention, by differently setting values of continuous marking packets that are transmitted to the same lane, a width of a time period that can be aligned can be extended.

Next, a method of adjusting a transmission rate in a process of transmitting a packet in the Ethernet apparatus 10 including the PHY apparatus 300 according to an exemplary embodiment of the present invention will be described in detail with reference to FIG. 3. Herein, a first transmission represents a transmission rate that has been used for transmitting a packet stream and a second transmission rate represents a transmission rate that is newly determined to be used for transmitting a packet stream.

Figure 3:
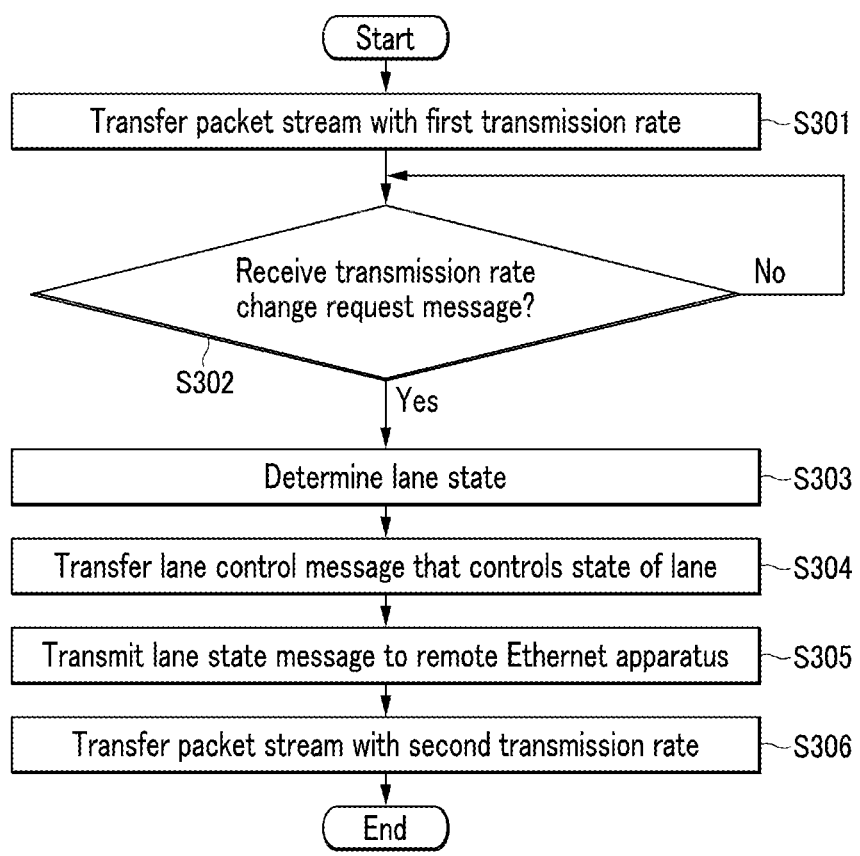
FIG. 3 is a flowchart illustrating a method of adjusting a transmission rate in a process of transmitting a packet in an Ethernet apparatus according to an exemplary embodiment of the present invention.

FIG. 3 is a flowchart illustrating a method of adjusting a transmission rate in a process of transmitting a packet in an Ethernet apparatus according to an exemplary embodiment of the present invention.

Referring to FIG. 3, the MAC apparatus 200 transfers a packet stream to the PHY apparatus 300 with the first transmission rate (S301).

When packet streams with the first transmission rate are transmitting as above, the MAC apparatus 200 determines whether a transmission rate change request message corresponding to a request for changing from the first transmission rate to a second transmission rate, which is a new transmission rate, is received (S302). Here, the transmission rate change request message includes the set number, i.e., the number of the lanes that are determined according to whether a present transmission rate in the Ethernet link 30 is higher than or lower than a required transmission rate. For example, in a state where the set number of lanes to transmit a packet is set according to the first transmission rate, when a second transmission rate, which is a new transmission rate is determined, if the second transmission rate is larger than the first transmission rate, the transmission rate controller 110 increases the number of the set lanes, and if the second transmission rate is smaller than the first transmission rate, the transmission rate controller 110 decreases the number of the set lanes.

In this way, the number of the set lanes that are decreased or increased according to a new transmission rate is included in the transmission rate change request message and is transferred to the MAC apparatus 200. When the transmission rate change request message is received, the MAC apparatus 200 determines a lane state for the second transmission rate to correspond to the transmission rate change request message (S303). That is, the MAC apparatus 200 determines a state of the set number of lanes that are included in the transmission rate change request message. Here, the lane state includes an activation state in which a packet can be transmitted through the lane and an inactivation state in which a packet cannot be transmitted. In this case, the MAC apparatus 200 determines the set number of lanes of a plurality of usable lanes as lanes of an activation state and the remaining lanes as lanes of an inactivation state.

In this case, the MAC apparatus 200 transfers a lane control message including a state of the determined lanes to the PHY apparatus 300, and the PHY apparatus 300 changes the lane state to correspond to the received lane control message (S304). That is, the PHY apparatus 300 activates lanes that are determined as an activation state of a plurality of usable lanes and inactivates lanes that are determined as an inactivation state.

Further, the MAC apparatus 200 transmits a lane state message to the remote Ethernet apparatus 20 to notify a state change of lanes (S305). Here, the lane state message includes information representing a state of each of a plurality of usable lanes and includes, for example, information representing an activation state and an inactivation state of an identifier of each lane. A lane control message that is transferred from the MAC apparatus 200 to the PHY apparatus 300 may also include information such as a lane state message.

The MAC apparatus 200 transfers a packet stream to the PHY apparatus 300, and the PHY apparatus 300 distributes the packet stream to the activated lanes. Therefore, packets are transmitted to the remote Ethernet apparatus 20 through activated lanes of the set number corresponding to a newly determined second transmission rate and consequently, a transmission rate of packets that are transmitted to the remote Ethernet apparatus 20 changes according to the number of lanes that transmit packets.

In this case, the PHY apparatus 300 inserts each marking packet between packets of activated lanes at the same time point, and the receiving side can align and use the received packets based on marking packets. A width of a time period that aligns packets can be extended according to insertion of the marking packets.

Next, the PHY apparatus 300 in a process of receiving a packet according to an exemplary embodiment of the present invention will be described in detail with reference to FIG. 4.

Figure 4:
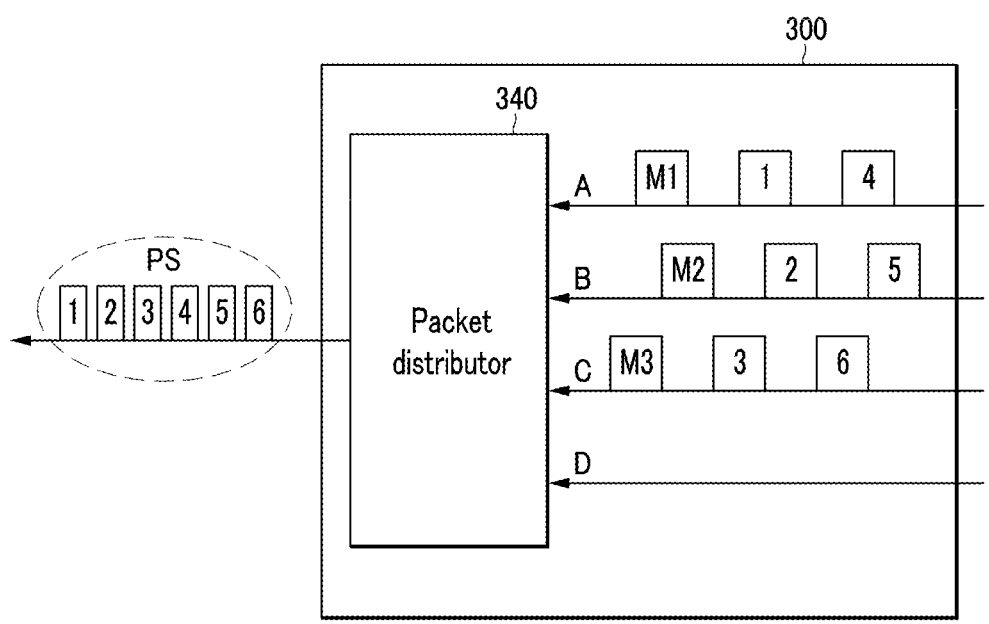
FIG. 4 is a block diagram illustrating a PHY apparatus in a process of receiving a packet according to an exemplary embodiment of the present invention.

FIG. 4 is a block diagram illustrating a PHY apparatus in a process of receiving a packet according to an exemplary embodiment of the present invention.

First, because a lane is a physically independent route, packets that are transmitted from a transmission terminal at the same time point may arrive in different orders. For example, a first packet 1 that is received in the first lane A and a third packet 3 that is received in the third lane C were transmitted at the same time point, but at the receiving side, the third packet 3 that is transmitted to the third lane C may arrive first.

Referring to FIG. 4, a packet combining device 340 that is included in the PHY apparatus 300 receives, for example, the first packet 1 and the fourth packet 4 in the first lane A, the second packet 2 and the fifth packet 5 in the second lane B, and the third packet 3 and the sixth packet 6 in the third lane C, and combines the packets into one packet stream PS and outputs the one packet stream PS. When the packets are combined into one packet stream PS, the packet combining device 340 aligns marking packets that are inserted into each lane and adjusts an alignment order of packets that are received through each lane.

Due to different delay in each lane, when a reception order of the packet does not correspond to a transmission order of the packet, the packet combining device 340 adjusts a combination order of packets between lanes based on a marking packet, and thereby transferring the same packet stream PS as that before transmission to the MAC apparatus 200.

Next, a method of adjusting a transmission rate in a process of receiving a packet in the Ethernet apparatus 10 including the PHY apparatus 300 according to an exemplary embodiment of the present invention will be described in detail reference to FIG. 5.

Figure 5:
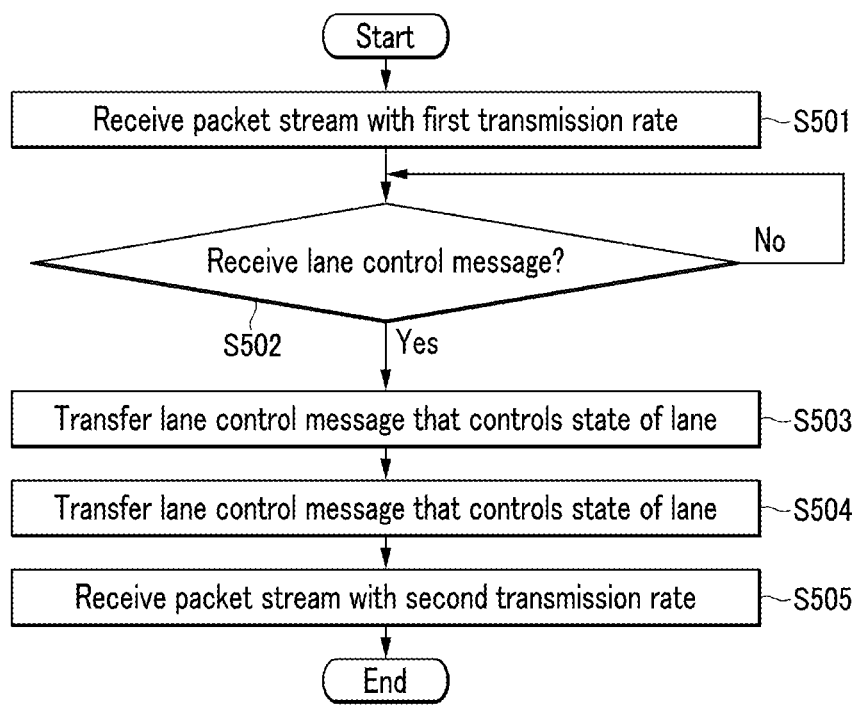
FIG. 5 is a flowchart illustrating a method of adjusting a transmission rate in a process of receiving a packet in an Ethernet apparatus according to an exemplary embodiment of the present invention.

FIG. 5 is a flowchart illustrating a method of adjusting a transmission rate in a process of receiving a packet in an Ethernet apparatus according to an exemplary embodiment of the present invention.

Referring to FIG. 5, in a state where the Ethernet apparatus 10 receives packets that are transmitted according to the first transmission rate from the remote Ethernet apparatus 20, the MAC apparatus 200 of the Ethernet apparatus 10 receives a packet stream with the first transmission rate to transfer the packet stream to the host apparatus 100 (S501).

In such a state, the MAC apparatus 200 determines whether a lane state message is received from the remote Ethernet apparatus 20 in order to determine whether the change of a transmission rate (S502). Here, the lane state message includes information of lanes that are activated by the number that is set according to a transmission rate (for example, a second transmission rate) that is determined by the remote Ethernet apparatus 20 and includes, for example, information representing an activation state and an inactivation state of identifiers of each lane, as described above.

When the lane state message is received from the remote Ethernet apparatus 20, the MAC apparatus 200 determines a lane state according to the lane state message (S503). The MAC apparatus 200 transfers a lane control message including the determined lane state to the PHY apparatus 300 to change the lane state (S504). Specifically, the MAC apparatus 200 transfers a lane control message that changes a state of a lane corresponding to an identifier in an activation state in the lane state message to an activation state in which a packet can be received and that changes a state of a lane corresponding to an identifier in an inactivation state in the lane state message to an inactivation state in which a packet cannot be received to the PHY apparatus 300, and the PHY apparatus 300 converts a state of each lane based on the lane control message.

Therefore, packets that are transmitted from the remote Ethernet apparatus 20 are received through activated lanes according to a second transmission rate that is determined in the remote Ethernet apparatus 20. That is, the Ethernet apparatus 10 receives packets that are transmitted according to the second transmission rate while receiving packets that are transmitted according to the first transmission rate.

The PHY apparatus 300 combines packets that are received through the activated lanes into a packet stream. In this case, the PHY apparatus 300 combines packets into a packet stream by adjusting an alignment order of packets that are received through the each lane based on marking packets that are inserted between packets that are received through the each activated lane.

The PHY apparatus 300 transfers the combined packet stream to the MAC apparatus 200 (S505).

The Ethernet apparatus 10 adjusts the number of the lanes to receive based on a lane state message that is transmitted from the remote Ethernet apparatus 20 through such a process, thereby easily receiving packets that are transmitted according to a new transmission rate from the remote Ethernet apparatus 20.

In the foregoing exemplary embodiment, the Ethernet apparatus 10 receives a lane state message from the remote Ethernet apparatus 20 and determines the number of lanes to receive packets based on the lane state message, but otherwise the Ethernet apparatus 10 may independently determine a transmission rate equally when transmitting a packet regardless of the remote Ethernet apparatus 20 and determine the number of lanes to receive packets according to the determined transmission rate.

According to an exemplary embodiment of the present invention, as the Ethernet apparatus adaptively adjusts a state of a lane according to generation characteristics of traffic, energy consumption in a transmission terminal and a reception terminal forming a single lane can be reduced.

Further, according to an exemplary embodiment of the present invention, a method of distributing packets between lanes and a packet matching method can generate a single packet stream in which an order is sustained at the receiving side in spite of a delay difference of lanes by periodically inserting a defined predetermined packet in order to instruct an alignment time point.

An exemplary embodiment of the present invention that is described above may not only be embodied through an apparatus and/or method, but is also embodied through a program that implements a function corresponding to a configuration of the exemplary embodiment of the present invention or a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of adjusting a transmission rate when transmitting a packet stream from an Ethernet apparatus to a remote Ethernet apparatus, the method comprising:

determining, by the Ethernet apparatus, a transmission rate of the packet stream;

setting, by the Ethernet apparatus, the number of lanes to transmit the packet stream according to the determined transmission rate;

converting, by the Ethernet apparatus, a state of at least one lane to an activation state in which a packet can be transmitted according to the set number;

distributing packets that are included in the packet stream to lanes in the activation state;

inserting a marking packet that indicates an alignment order between lanes between packets that are distributed to each lane in the activation state, the marking packet including a bit value corresponding to the lane in which it is sent; and transmitting packets between which the marking packet is inserted to the remote Ethernet apparatus through a corresponding lane, wherein consecutive marking packets transmitted in the same lane have different values from one another, the different values extending a time period for alignment.

2. The method of claim 1, wherein the Ethernet apparatus and the remote Ethernet apparatus transmit and receive packets through a plurality of lanes, and the converting of a state of at least one lane comprises:

converting a state of the set number of lanes of a plurality of lanes to an activation state in which a packet can be transmitted; and converting a state of the remaining lanes of a plurality of lanes to an inactivation state in which a packet cannot be transmitted.

3. The method of claim 1, further comprising transmitting, by the Ethernet apparatus, a lane state message comprising an identifier of activated lanes to the remote Ethernet apparatus.

4. The method of claim 1, further comprising:

combining a plurality of packets received through separate lanes into a single packet stream, wherein the sequence of packets in the single packet stream is based on information in marking packets received through the separate lanes.

5. The method of claim 4, wherein the transmitted packets are transmitted in the single packet stream, the marking packets are inserted into separate lanes at the same time, and the order of packets in the single packet stream is based on the marking packets.

6. The method of claim 1, wherein a first sequence control character is transmitted in a first lane, and a second sequence control character is transmitted in a second lane, each of the sequence control characters including a bit value corresponding to the lane in which it is sent.

7. A method of adjusting a transmission rate when an Ethernet apparatus receives packets from a remote Ethernet apparatus, the method comprising:

determining, by the Ethernet apparatus, the transmission rate;

setting, by the Ethernet apparatus, the number of lanes to receive packets according to the determined transmission rate;

converting, by the Ethernet apparatus, a state of at least one lane to an activation state in which a packet can be received according to the set number;

receiving, by the Ethernet apparatus, the packets with the determined transmission rate from the remote Ethernet apparatus through the activated lane; and aligning the received packets and combining the packets into one packet stream based on a marking packet that is inserted between packets that are received through each lane, the marking packets including a bit value corresponding to the lane in which it is sent, wherein consecutive marking packets transmitted in the same lane have different values from one another, the different values extending a time period for alignment.

8. The method of claim 7, wherein the Ethernet apparatus and the remote Ethernet apparatus transmit and receive packets through a plurality of lanes, and the converting of a number state of at least one lane comprises:

converting a state of the set number of lanes of a plurality of lanes to an activation state in which a packet can be received; and converting a state of the remaining lanes of a plurality of lanes to an inactivation state in which a packet cannot be received.

9. The method of claim 7, wherein the marking packet comprises an alignment order of the packets.

10. The method of claim 7, further comprising:

receiving, by the Ethernet apparatus, a lane state message comprising an identified of activated lanes from the remote Ethernet apparatus according to a transmission rate that is determined by a remote Ethernet apparatus, wherein the determining of the transmission rate comprises determining, by the Ethernet apparatus, the transmission rate based on the lane state message.

11. An Ethernet apparatus comprising:

a transmission rate controller that determines a transmission rate corresponding to packets to transmit and that determines the set number of lanes based on the determined transmission rate;

a lane state controller that converts a state of a plurality of lanes to one of an activation state in which a packet can be transmitted and an inactivation state in which a packet cannot be transmitted using the set number of lanes; and a lane transmission processor that distributes the packets to lanes in an activation state and that transmits at least one packet to an external remote Ethernet apparatus through a corresponding lane, wherein the lane transmission processor inserts, when transmitting the at least one packet through a corresponding lane, a marking packet that indicates an alignment order of packets between packets that are transmitted through the corresponding lane, the marking packet including a bit value corresponding to the corresponding lane, and wherein consecutive marking packets transmitted in the same lane have different values from one another, the different values extending a time period for alignment.

12. The Ethernet apparatus of claim 11, wherein the transmission rate controller determines the number of lanes to a set number by decreasing or increasing the number of lanes corresponding to a present transmission rate according to whether a present transmission rate is higher or lower than the determined transmission rate.

13. The Ethernet apparatus of claim 11, wherein the lane state controller converts a state of a set number of lanes of a plurality of lanes to an activation state in which a packet can be transmitted and a state of the remaining lanes to an inactivation state in which a packet cannot be transmitted.

14. An Ethernet apparatus comprising:

a lane state controller that sets the number of lines for receiving a packet according to a transmission rate for receiving the packet and that converts a state of a plurality of lanes to one of an activation state in which a packet can be received and an inactivation state in which a packet cannot be received based on the set number of lanes; and a lane reception processor that receives at least one packet that is transmitted from a remote Ethernet apparatus through each lane in an activation state and that combines the received packets into one packet stream, wherein the lane reception processor aligns the received packets and combines the packets into one packet stream based on marking packets received in each lane, each of the marking packets including a bit value corresponding to the lane in which it is sent, and wherein consecutive marking packets transmitted in the same lane have different values from one another, the different values extending a time period for alignment.

15. The Ethernet apparatus of claim 14, wherein the lane state controller receives a lane state message comprising a state of activated lanes from the remote Ethernet apparatus according to a transmission rate that is determined by the remote Ethernet apparatus, determines a transmission rate for receiving the packet based on the received lane state message, and determines the set number of lanes according to the determined transmission rate.

16. The Ethernet apparatus of claim 14, wherein the lane state controller converts a state of a set number of lanes of a plurality of lanes to an activation state in which a packet can be received and converts a state of the remaining lanes to an inactivation state in which a packet cannot be received.

17. The Ethernet apparatus of claim 14, wherein the marking packet comprises an alignment order of the packets.

18. A method of adjusting a transmission rate of a packet between an Ethernet apparatus and a remote Ethernet apparatus, the method comprising:
 receiving, when transmitting a packet stream with a first transmission rate, by the Ethernet apparatus, a lane state message from the remote Ethernet apparatus, wherein the lane message comprises an identifier of at least one lane activated according to a second transmission rate that is determined by the remote Ethernet apparatus;
 determining, by the Ethernet apparatus, the transmission rate from the first transmission rate into the second transmission rate based on the lane state message;
 setting, by the Ethernet apparatus, the number of lanes to transmit the packet stream according to the second transmission rate;
 converting, by the Ethernet apparatus, a state of at least one lane to an activation state in which a packet can be transmitted according to the set number;
 inserting marking packets that indicate an alignment order between lanes between packets that are distributed to each lane in the activation state, each of the marking packets including a bit value corresponding to the lane in which it is sent;
 transmitting, by the Ethernet apparatus, the packet stream to the remote Ethernet apparatus with the second transmission rate through the activated lane;
 receiving, by the remote Ethernet apparatus, the packets with the second transmission rate from the Ethernet apparatus through at least one lane in activation state in which a packet can be received according to the set number based on the second transmission rate; and
 aligning the received packets and combining the packets into one packet stream based on a marking packet that is included in packets that are received through each lane,
 wherein consecutive marking packets transmitted in the same lane have different values from one another, the different values extending a time period for alignment.

19. The method of claim 18, further comprising:
 determining a sequence of packets in a packet stream transmitted by the remote Ethernet apparatus; and
 adjusting the alignment order of packets in a transmitted packet stream based on the marking packets,
 wherein the alignment order is a sequential order of packets in a packet stream.

\* \* \* \* \*